United States Patent
Zweig et al.

(10) Patent No.: US 11,442,874 B2
(45) Date of Patent: Sep. 13, 2022

(54) SYSTEM AND METHOD FOR GENERATING A MODIFIED INPUT/OUTPUT DEVICE POLICY FOR MULTIPLE USERS

(71) Applicant: Intuition Robotics, Ltd., Ramat-Gan (IL)

(72) Inventors: Shay Zweig, Harel (IL); Alex Keagel, Tel Aviv (IL); Itai Mendelsohn, Tel Aviv (IL); Roy Amir, Mikhmoret (IL); Dor Skuler, Oranit (IL)

(73) Assignee: Intuition Robotics, Ltd., Ramat-Gan (IL)

( * ) Notice: Subject to any disclaimer, the term of this patent is extended or adjusted under 35 U.S.C. 154(b) by 0 days.

(21) Appl. No.: 17/230,157

(22) Filed: Apr. 14, 2021

(65) Prior Publication Data

US 2021/0326274 A1    Oct. 21, 2021

Related U.S. Application Data

(60) Provisional application No. 63/010,118, filed on Apr. 15, 2020.

(51) Int. Cl.
| | |
|---|---|
| *G06F 13/10* | (2006.01) |
| *G06F 9/445* | (2018.01) |
| *G06F 9/00* | (2006.01) |
| *G06F 3/06* | (2006.01) |

(52) U.S. Cl.
CPC ........ *G06F 13/102* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 10,979,676 B1 * | 4/2021 | Kelly | ..... H04N 7/183 |
| 2019/0237095 A1 * | 8/2019 | Duguid | ..... G10L 25/54 |

* cited by examiner

*Primary Examiner* — Scott C Sun
(74) *Attorney, Agent, or Firm* — M&B IP Analysts, LLC

(57) ABSTRACT

A system and method for generating a modified input/output (I/O) device policy for multiple users. A method includes generating a modified policy based on a first policy and a second policy, wherein the modified policy is generated when a first user and a second user are located within a predetermined distance of each other, wherein the first policy is generated for the first user based on a first dataset including data related to the first user with respect to at least one I/O device, wherein the second policy is generated for the second user based on data related to the at least one I/O device; and executing at least one plan based on the modified policy, wherein executing the at least one plan further comprises causing the at least one I/O device to output a signal for causing at least one action by an external system.

15 Claims, 5 Drawing Sheets

SYSTEM AND METHOD FOR GENERATING A MODIFIED INPUT/OUTPUT DEVICE POLICY FOR MULTIPLE USERS

CROSS-REFERENCE TO RELATED APPLICATIONS

This application claims the benefit of U.S. Provisional Application No. 63/010,118 filed on Apr. 15, 2020, the contents of which are hereby incorporated by reference.

TECHNICAL FIELD

The disclosure generally relates to digital assistants configured to cause outputs via input/output (I/O) devices and, more specifically, to a system and method for generating a modified input/output device policy for multiple users.

BACKGROUND

As manufacturers improve the functionality of devices such as vehicles, computers, mobile phones, appliances, and the like, through the addition of digital features, manufacturers and end-users may desire enhanced device functionalities. The manufacturers, as well as the relevant end-users, may desire digital features which improve user experiences and interactions and features which provide for greater connectivity. Certain manufacturers may include device-specific features, such as setup wizards and virtual assistants, to improve device utility and functionality. Further, certain software packages may be added to devices, either at the point of manufacture, or by the user after purchase, to improve device functionality. Such software packages may provide functionalities including, as examples, voice control of computer systems, facial recognition and biometric authentication, and the like.

While the features and functionalities described hereinabove provide for certain enhancements to a user's experience when interacting with a device, the same features and functionalities, as may be added to a device by a user or manufacturer, fail to include certain aspects which may allow for a further-enhanced user experience. First, certain currently-implemented digital assistants and other user experience features may fail to provide for adaptive adjustment of the operation of the assistant or feature. For example, a digital assistant configured to manage cell phone operation based on voice commands may allow for the selection of certain music to play through a device speaker, but may not be configured to learn a user's preferences and automatically update the music selection based on detected user responses such as facial expressions, speech, gestures, and the like.

In addition, certain currently-implemented digital assistants and other user experience features may fail to provide for adjustment of assistant or feature operation based on context or environment data. As an example, where two users are riding in a car together, both users may wish to be able to adjust the operation of the car's music-player system. However, the music-player system may be configured to respond to only one user, such as by only accepting a "next song" voice command from the driver. In such a situation, although the second user may wish to also adjust the music system, the system may be limited to accepting input only from a first user. As a result, although an adaptive mode supporting dual-user operation may be appropriate in a case of two users in the same environment, the same adaptive mode may not be supported by currently-implemented digital assistants and other user experience features.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a modified input/output (I/O) device policy for multiple users. The method comprises generating a modified policy based on a first policy and a second policy, wherein the modified policy is generated when a first user and a second user are located within a predetermined distance of each other, wherein the first policy is generated for the first user based on a first dataset including data related to the first user with respect to at least one I/O device, wherein the second policy is generated for the second user based on data related to the at least one I/O device; and executing at least one plan based on the modified policy, wherein executing the at least one plan further comprises causing the at least one I/O device to output a signal for causing at least one action by an external system with respect to the outside world.

Certain embodiments disclosed herein also include a non-transitory computer readable medium having stored thereon instructions for causing a processing circuitry to execute a process, the process comprising generating a modified policy based on a first policy and a second policy, wherein the modified policy is generated when a first user and a second user are located within a predetermined distance of each other, wherein the first policy is generated for the first user based on a first dataset including data related to the first user with respect to at least one I/O device, wherein the second policy is generated for the second user based on data related to the at least one I/O device; and executing at least one plan based on the modified policy, wherein executing the at least one plan further comprises causing the at least one I/O device to output a signal for causing at least one action by an external system with respect to the outside world.

In addition, certain embodiments disclosed herein include a system for generating a modified input/output (I/O) device policy for multiple users. The system comprises: a processing circuitry; and a memory, the memory containing instructions that, when executed by the processing circuitry, configure the system to: generate a modified policy based on a first policy and a second policy, wherein the modified policy is generated when a first user and a second user are located within a predetermined distance of each other, wherein the first policy is generated for the first user based on a first dataset including data related to the first user with respect to at least one I/O device, wherein the second policy is generated for the second user based on data related to the at least one I/O device; and execute at least one plan based on the modified policy, wherein executing the at least one plan further comprises causing the at least one I/O device to output a signal for causing at least one action by an external system with respect to the outside world.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
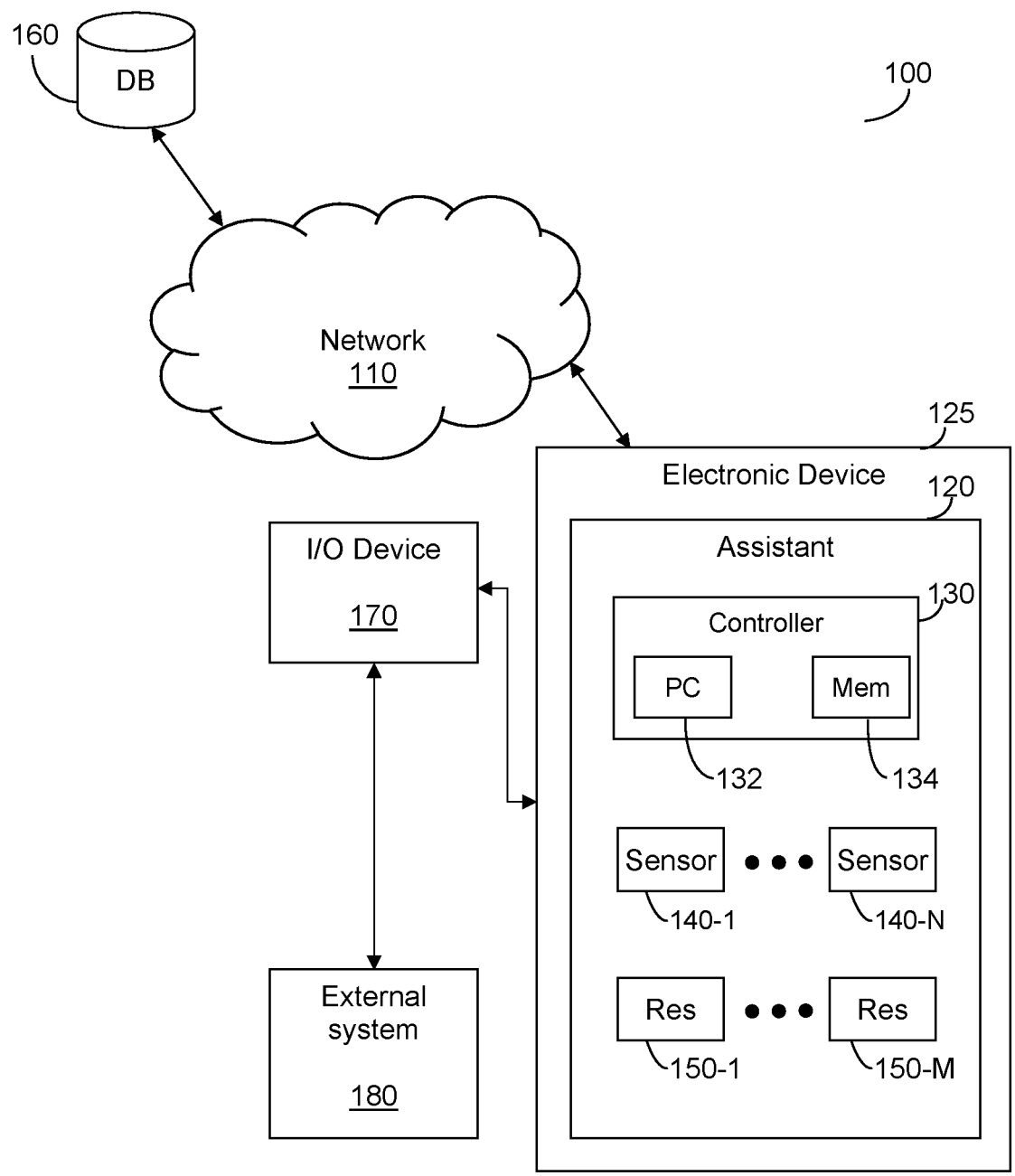
FIG. 1 is a network diagram depicting a system for generating a modified input/output device policy for multiple users, according to an embodiment.

The embodiments disclosed by the disclosure are only examples of the many possible advantageous uses and implementations of the innovative teachings presented herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein relate to the analysis of sensor data, as may relate to a user, the conditions of the user's environment, and the like, as well as the application of such analyzed data to the generation, customization, and execution of various digital assistant programs, routines, services, and the like. The disclosed embodiments provide for reduced processing time and, thus, improved computational efficiency in the modification and execution of digital assistant routines, and, in particular, the modification and execution of such routines where modification and execution includes analysis of one or more attributes or data features relating to a user.

By collecting and analyzing a first dataset of a first user and a second dataset of at least a second user, a first policy and a second policy of the digital assistant, which are associated with each respective user, are generated. When the first user and the at least a second user are identified as near each other within a predetermined distance, a modified policy, which suits the preferences and the needs of the first user and of the second user, is generated. The modified policy is used for controlling the execution of plans that are executed by the digital assistant, in order to adjust the plans to suit the plurality of identified users. The plans executed by the digital assistant include causing outputs via one or more input/output (I/O) devices.

The embodiments disclosed herein provide specific advantages in the solution of multi-user digital assistant customization problems. As multiple users may have multiple, separate preferences, such as different preferred temperatures, different preferred music types, and the like, identifying conditions which are acceptable to multiple users may be challenging. While users may be able to manually adjust environmental conditions, eventually reaching a consensus acceptable to all users present, such a manual process is time-consuming, requires extensive communication between users, and is, ultimately a subjective process. The embodiments disclosed herein provide for objective identification of multi-user compromises which suit the preferences of the users present.

The disclosed embodiments further provide techniques in which one or more I/O devices are utilized in order to improve users' experiences even in situations where the users' preferences may diverge. Moreover, historical data related to users' preferences with respect to outputs by input/output devices may be utilized in order to determine policies for each user related to those input/output devices, which, in turn, are used to generate a modified policy for both users with respect to the input/output devices.

Additionally, in accordance with various disclosed embodiments, a modified policy is generated only when two users are identified within a predetermined distance of each other. Generating the modified policy only when the users are identified in proximity of each other avoids unnecessary policy generation and improves accuracy of the modified policy by using the most up-to-date policies of the individual users when the modified policy is about to be used to execute one or more plans. This accuracy, in turn, improves efficiency of the I/O device(s) being controlled by avoiding unsuitable outputs which would, in turn, prompt the users to manually reconfigure the I/O device(s).

FIG. 1 is an example network diagram 100 depicting a system for generating a modified input/output device policy for multiple users, according to an embodiment. The network diagram 100 includes a digital assistant 120 and an electronic device 125, as well as an input/output (I/O) device 170 communicatively connected to the electronic device 125, and an external system 180 connected to the I/O device 170. In some embodiments, the assistant 120 is further connected to a network, where the network 110 may provide for communication between the elements shown in the network diagram 100. The network 110 may be, but is not limited to, a local area network (LAN), a wide area network (WAN), a metro area network (MAN), the Internet, a wireless, cellular, or wired network, and the like, and any combination thereof.

In an embodiment, the digital assistant 120 may be connected to, or implemented on, the electronic device 125. The electronic device 125 may be, for example and without limitation, a robot, a social robot, a service robot, a smart TV, a smartphone, a wearable device, a vehicle, a computer, a smart appliance, and the like.

The digital assistant 120 includes a controller 130, explained in more detail below in FIG. 2, having at least a processing circuitry (PC) 132 and a memory (mem) 134. The digital assistant 120 may further include, or be connected to, one or more sensors 140-1 to 140-N, where N is an integer equal to or greater than 1 (hereinafter referred to as "sensor" 140 or "sensors" 140 for simplicity) and one or more resources (res) 150-1 to 150-M, where M is an integer equal to or greater than 1 (hereinafter referred to as "resource" 150 or "resources" 150 for simplicity). The resources 150 may include, for example, electro-mechanical elements, display units, speakers, and the like. In an embodiment, the resources 150 may include sensors 140 as well.

The sensors 140 may include input devices, such as various sensors, detectors, microphones, touch sensors, movement detectors, cameras, and the like. Any of the sensors 140 may be, but are not necessarily, communicatively, or otherwise connected to the controller 130 (such connection is not illustrated in FIG. 1 for the sake of simplicity and without limitation on the disclosed embodiments). The sensors 140 may be configured to sense signals received from one or more users, signals received from the environment surrounding the user (or users), and the like. The sensors 140 may be positioned on, or connected to, the electronic device 125 (e.g., a vehicle, a robot, and the like). In an embodiment, the sensors 140 may be implemented as virtual sensors that receive inputs from online services, e.g., the weather forecast, a user's calendar, and the like.

In an embodiment, the network diagram 100 further includes a database 160. The database 160 may be stored within the digital assistant 120 (e.g., within a storage device not shown), or may be separate from the digital assistant 120 and connected thereto via the network 110. The database 160 may be utilized for storing, for example, historical data about one or more users, users' preferences and related policies, and the like, as well as any combination thereof.

The I/O device 170 is configured to generate, transmit, receive, or the like, as well as any combination thereof, one or more signals relevant to the operation of the external system 180. In an embodiment, the I/O device 170 is further configured to at least cause one or more outputs in the outside world (i.e., the world outside the computing components shown in FIG. 1) via the external system 180, based on plans determined by the assistant 120 as described herein.

The I/O device 170 may be communicatively connected to the electronic device 125 and the external system 180. It may be understood that, while the I/O device 170 is depicted as separate from the electronic device 125, the I/O device 170 may be included in the electronic device 125, or any component or sub-component thereof, without loss of generality or departure from the scope of the disclosure.

The external system 180 is a device, component, system, or the like, configured to provide one or more functionalities, including various interactions with external environments. The external system 180 is a system separate from the electronic device 125, although the external system 180 may be co-located with, and connected to, the electronic device 125, without loss of generality or departure from the scope of the disclosure. Non-limiting examples of external systems 180 may include, without limitation, air conditioning systems, lighting systems, sound systems, and the like.

As an example of the operation of the system described with respect to the network diagram 100, according to an embodiment, operation of the system may include generating one or more commands for controlling the external system 180, where such commands are generated as described herein by the assistant 120, and are executed by configuration of the I/O device 170 to send a control signal to the external system 180.

Figure 2:
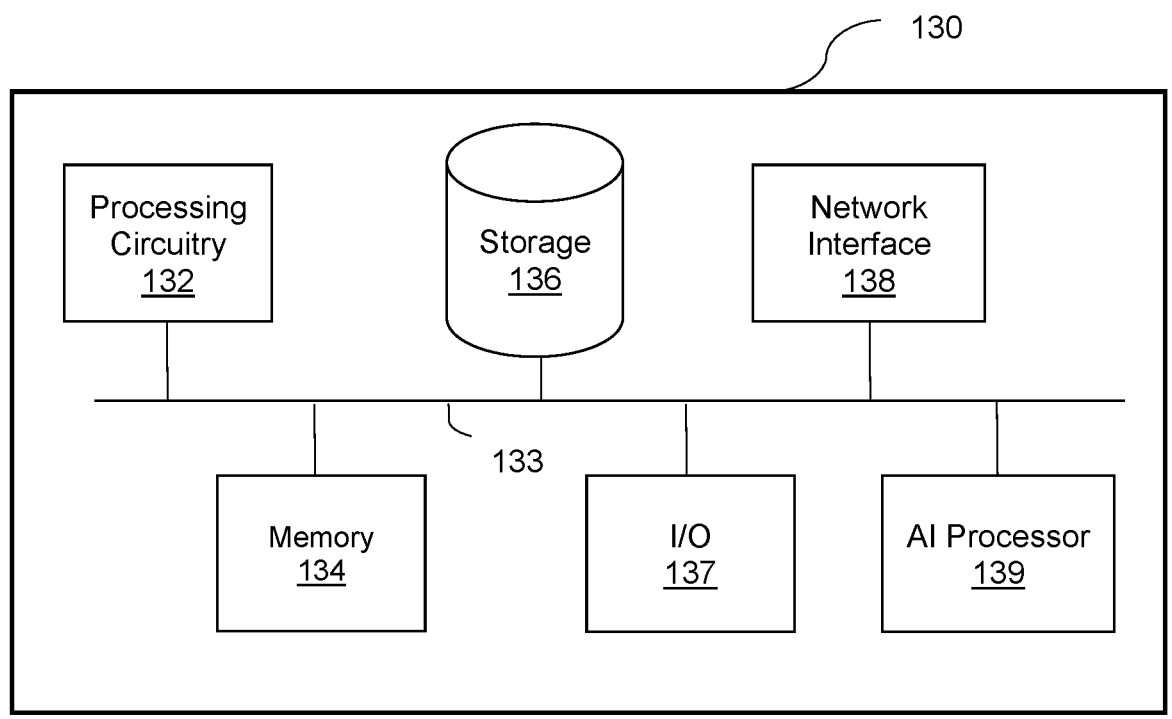
FIG. 2 is a block diagram of a controller, according to an embodiment.

FIG. 2 is an example block diagram of a controller 130 acting as a hardware layer of a digital assistant, e.g., the digital assistant 120 of FIG. 1, according to an embodiment. The controller 130 includes a processing circuitry 132 that is configured to receive data, analyze data, generate outputs, and the like, as further described hereinbelow. The processing circuitry 132 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 130 further includes a memory 134. The memory 134 may contain therein instructions that, when executed by the processing circuitry 132, cause the controller 130 to execute actions as further described hereinbelow. The memory 134 may further store therein information, e.g., data associated with one or more users, historical data about one or more users, users' preferences and related policies, and the like.

The storage 136 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

In an embodiment, the controller 130 includes a network interface 138 that is configured to connect to a network, e.g., the network 110 of FIG. 1. The network interface 138 may include, but is not limited to, a wired interface (e.g., an Ethernet port) or a wireless port (e.g., an 802.11 compliant Wi-Fi card), configured to connect to a network (not shown).

The controller 130 further includes an input/output (I/O) interface 137 configured to control the resources 150 (shown in FIG. 1) which are connected to the digital assistant 120. In an embodiment, the I/O interface 137 is configured to receive one or more signals captured by sensors 140 of the digital assistant 120 and to send such signals to the processing circuitry 132 for analysis. According to an embodiment, the I/O interface 137 is configured to analyze the signals captured by the sensors 140, detectors, and the like. According to a further embodiment, the I/O interface 137 is configured to send one or more commands to one or more of the resources 150 for executing one or more plans (e.g., actions) of the digital assistant 120, as further discussed hereinbelow. A plan may include, for example, suggesting that the user play Jazz music, suggesting initiation of a navigation plan to a specific address, and the like. According to a further embodiment, the components of the controller 130 are connected via a bus 133.

In an embodiment, the controller 130 further includes an artificial intelligence (AI) processor 139. The AI processor 139 may be realized as one or more hardware logic components and circuits, including graphics processing units (GPUs), tensor processing units (TPUs), neural processing units, vision processing units (VPU), reconfigurable field-programmable gate arrays (FPGA), and the like. The AI processor 139 is configured to perform, for example, machine learning based on sensory inputs received from the I/O interface 137, where the I/O interface 137 receives input data, such as sensory inputs, from the sensors 140.

In an embodiment, the controller 130 is configured to collect a first dataset about a first user. It should be noted that the first user may be a user of a digital assistant, e.g., the digital assistant 120. The first dataset may be collected from a plurality of sensors (e.g., the sensors 140). The first dataset may include for example, images, video, audio signals, and the like, that are captured in real-time or near real-time with respect to the first user. In an embodiment, the first dataset may further include historical data about the first user, data from one or more web sources, and the like. The first dataset may include data that is related to the environment near the first user, such as the temperature outside the first user's house or vehicle, traffic conditions, and the like. It should be noted that the first dataset may be collected constantly or periodically.

In an embodiment, the controller 130 is configured to analyze the first dataset. The analysis may be achieved by applying at least one algorithm, such as a machine learning algorithm, to the first dataset. The at least one algorithm may be adapted to determine a first policy for the operation of the digital assistant 120 based on the collected first dataset. That is, the first dataset may be fed into the algorithm, thereby allowing the algorithm to determine a first policy that is associated with the first user.

In an embodiment, the controller 130 is configured to, based on the analysis, generate a first policy that is associated with the first user. The first policy may include a statement, for example, that the first user enjoys listening to Jazz music, that the first user usually selects the longer route on his way back from work, that podcasts about technology are the user's favorite podcasts, and the like. In an embodiment, the first policy may include a first set of behavior rules to be used by the digital assistant 120 when interacting with the first user. The first set of behavior rules may include specific guidelines indicating which plan shall be executed by the digital assistant 120, and in which manner, when the first user is identified.

That is, the first dataset is collected with respect to a first user and analyzed.

Thereafter, a corresponding policy is generated with respect to the first dataset. It should be noted that when the first user is identified alone near the digital assistant 120 (e.g., using one or more of the sensors 140), the first corresponding policy is used for executing plans by the digital assistant 120. The first policy adjusts the plans that are executed by the digital assistant 120 such that the plans suit the first user who is interacting with the digital assistant 120.

In an embodiment, the controller 130 is configured to collect a second dataset about a second user. It should be noted that one or more second users may be identified by the digital assistant as the common users of the same digital assistant, e.g., the digital assistant 120. A respective second dataset may be collected and analyzed for each such common user. The second dataset may be collected from a plurality of sensors (e.g., the sensors 140). The second dataset may include for example, images, video, audio signals, and the like, that are captured in real-time or near real-time with respect to the second user. In an embodiment, the second dataset may further include historical data about the second user, data from one or more web sources, and so on. The second dataset may include data that is related to the environment near the second user, such as the temperature outside the second user's house or vehicle, traffic conditions, and the like. It should be noted that the second dataset may be collected constantly or periodically.

In an embodiment, the controller 130 is configured to analyze the second dataset. The analysis may be achieved by applying at least one algorithm, such as a machine learning algorithm, to the second dataset. In an embodiment, the analysis of the second dataset, by application of at least one algorithm, may include application of one or more algorithms similar or identical to the algorithm or algorithms applied in the analysis of the first dataset, as described herein. The at least one algorithm may be adapted to determine a second policy for the operation of the digital assistant 120 based on the collected second dataset. That is, the second dataset may be fed into the algorithm, thereby allowing the algorithm to determine a second policy that is associated with the second user.

In an embodiment, the controller 130 is configured to generate, based on the analysis, a second policy that is associated with the second user. It should be noted that multiple second policies may be generated, such that each second user of a plurality of second users may be associated with a corresponding second policy. The second policy may include a statement, for example, that the second user enjoys listening to Pop music, that the second user usually selects the shortest route on his way back from work, that the second user has no interest in podcasts, and the like. In an embodiment, the second policy may include a second set of behavior rules to be used by the digital assistant 120 when interacting with the second user. The second set of behavior rules may include specific guidelines indicating which plan shall be executed by the digital assistant 120, and in which manner, when the second user is identified.

That is, the second dataset is collected with respect to at least a second user and analyzed. Thereafter, a corresponding policy is generated with respect to the second dataset. It should be noted that when the second user is identified alone near the digital assistant 120 (e.g., using one or more of the sensors 140), the second corresponding policy is used for executing plans by the digital assistant 120. The second policy adjusts the plans which are executed by the digital assistant 120 such that the plans suit the second user, who is interacting with the digital assistant 120.

In an embodiment, the controller 130 generates a modified policy based on the first policy and the second policy, upon determination that the first user and the second user are located within a predetermined distance of each other. It should be noted that determining whether the first user and the second user are located within the predetermined distance may be achieved by collecting real-time, or near real-time, sensor data from the environment near the user. The collected sensor data may be analyzed using, for example and without limitation, one or more computer vision techniques, audio signal processing techniques, machine learning techniques, and the like. The predetermined distance may be, for example, no more than two-and-a-half meters between the first user and the second user. Thus, for example, when a first user and a second user are standing next to each other in the kitchen and hug, both users are located within the predetermined distance, with respect to each other and to the digital assistant 120.

It should be noted that the modified policy may include multiple behavior rules that relate to many aspects about the user, such as navigation preferences (when the digital assistant 120 is operated in a vehicle), music preferences, patterns, and the like. A modified policy may be generated based on a combination of the first set of behavior rules of the first policy and the second set of behavior rules of the second policy, extraction of overlapping portions (e.g., behavior rules) of the first set of behavior rules and the second set of behavior rules, exploration of possible users' preferences based on the first policy and the second policy, and the like. Further, generation of the modified policy, based on preferences included in the respective user profiles, may include matching one or more preferences across such profiles and, where a preference match is identified, generating a corresponding rule for the modified policy. In addition, one or more of such preferences, including the preferences of the first user profile, the preferences of the second user profile, the matching preferences of the modified profile, or the like, may be ranked. Generation of the modified policy may include generation of one or more rules thereof, the rules specifying various priority levels based on factors including, without limitation, preference rankings. In an embodiment, the modified policy may be generated upon applying one or more rules to the first policy and to the second policy.

As a non-limiting example, a rule may include a determination that if the first policy indicates that the first user's favorite type of music is Jazz and if the second policy indicates that the second user's favorite type of music is Rhythm and Blues (R&B), the modified policy may suggest to listen to Soul music, which is the second-favorite type of music of both the first and the second user. It should be noted that exploration of new users' preferences may be achieved by extracting, from the first user policy and from the second user policy, data regarding the same category, e.g., podcast category. Thus, upon determination that there is no overlap between the users' favorite type of podcasts, a search is performed in a database, web-source, or the like, for an alternative type of podcast that both users would enjoy, based on the first collected dataset and the second collected dataset.

In an embodiment, the controller 130 may be configured to execute at least one plan generated by the digital assistant 120 based on the modified policy. A plan is an action or a series of actions that is executed by the digital assistant 120. A plan may be, for example, suggesting that a user listen to a certain type of music, initiating a navigation plan to a specific destination, and the like. It should be noted that the modified policy may affect the way a plan is usually executed, such as, for example and without limitation, by changing the order of a sequence of actions of a certain plan, changing the tone of the voice emitted by the digital assistant 120, and the like. According to an embodiment, although two users may be detected near the digital assistant 120 within the predetermined distance and a modified policy has been generated, a plan may be executed only when a trigger is received. For example, a trigger may be received upon detection that the two users just got into the vehicle, thus, the digital assistant 120 (which operates in the vehicle) may suggest initiating a navigation plan. As another example, a trigger may be identifying that two (or more) users, who are located within a predetermined distance, are bored and, therefore, to suggest to the users, using the modified policy, that the users listen to a podcast the users would both like.

According to an embodiment, after the at least one plan is executed, the controller 130 collects at least sensor data relating to at least a user response from the first user and/or from the second user with respect to the execution of the plan which is based on the modified policy. Collecting the sensor data may be achieved using at least one sensor (e.g., the sensors 140). The user response may include verbal expressions, gestures, facial expressions, and the like. The sensor data relating to the user response may be analyzed using, for example, a designated algorithm, such as a machine learning algorithm, where the algorithm is adapted to determine the nature of the user response. In an embodiment, the analysis is performed using, for example and without limitation, one or more computer vision techniques, audio signal processing techniques, machine learning techniques, and the like. Based on the result of the analysis of the user response, the controller 130 may be configured to update the modified policy. For example, based on the modified policy, a plan is executed and may, therefore, include a suggestion to listen to Jazz music when the first and the second users are identified as being next to each other. However, the response of at least one of the users may be classified as a negative response (based on the analysis of the sensor data of the users' response). According to the same example, the modified policy may be updated such that, in a future, similar, scenario, Jazz music will not be suggested.

With the system and method described above, policies (e.g., behavior policies) of electronic devices may be automatically modified to serve more than one user simultaneously. The modified policy or policies may reflect the requirements and preferences of more than one user.

Figure 3:
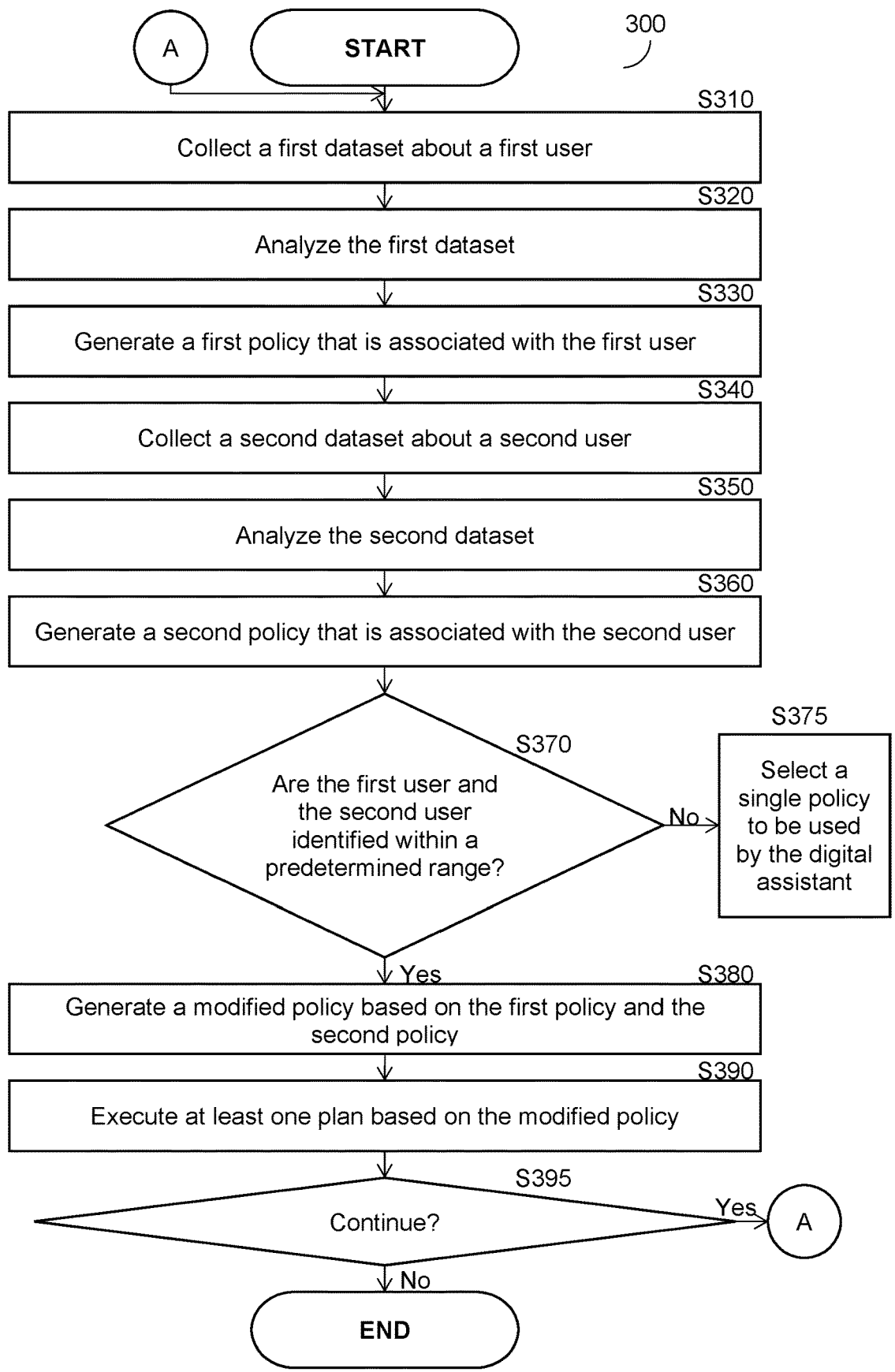
FIG. 3 is a flowchart illustrating a method for generating a modified input/output policy for multiple users, according to an embodiment.

FIG. 3 shows a flowchart 300 of a method for generating a modified input/output policy for multiple users, according to an embodiment. The method described with respect to FIG. 3 may be applicable to a scenario such as, for example and without limitation, one in which determination of a separate policy for each of two individuals, and generation of a policy based on the separate policies, is desirable. The method described herein may be executed by the controller 130 that is further described hereinabove with respect of FIG. 2.

At S310, a first dataset about a first user is collected. The first dataset may be collected using one or more sensors, e.g., the sensors 140, from the Internet, from the user's calendar, and the like. As described hereinabove, data, as may be included in the first dataset, which is collected using one or more sensors, such as the sensors 140, may include, without limitation, images, video, audio signals, and the like. Further, such data may be collected in real-time or near-real-time with respect to the first user. In addition, the first dataset may include, without limitation, data related to the environment near the first user such as, as examples and without limitation, temperature, traffic conditions, and the like.

In an embodiment, the first dataset may further include historical data pertaining to the first user, data from one or more web sources, and the like.

At S320, the first dataset is analyzed using at least one algorithm (e.g., a machine learning algorithm) that is applied to the first dataset. The at least one algorithm is adapted to determine a first policy for the operation of the digital assistant 120 based on the collected first dataset.

At S330, a first policy that is associated with the first user is generated. The first policy may include a first set of behavior rules to be used by the digital assistant 120 when interacting with the first user. In an embodiment, S330 may include storing the first policy for subsequent use, thereby allowing for conserving computing resources during subsequent instances when the first user is identified. More specifically, a stored policy for a user may be used to generate a new/second modified policy when the user is within a predetermined distance of another user (e.g., when the first user is within a predetermined distance of another user who may or may not be the second user) without needing to generate the policy for that individual user again.

At S340, a second dataset about a second user is collected. The second dataset may be collected using one or more sensors, e.g., the sensors 140, from the Internet, from the user's calendar, and the like. As described hereinabove, data, as may be included in the second dataset, which is collected using one or more sensors, such as the sensors 140, may include, without limitation, images, video, audio signals, and the like. Further, such data may be collected in real-time or near-real-time with respect to the second user. In addition, the second dataset may include, without limitation, data related to the environment near the second user such as, as examples and without limitation, temperature, traffic conditions, and the like.

In an embodiment, the second dataset may further include historical data pertaining to the second user, data from one or more web sources, and the like. Further, it may be understood that the first and second datasets may include the same type or types of information, where the information included in the first dataset relates to the first user and where the information included in the second dataset relates to the second user.

At S350, the second dataset is analyzed using at least one algorithm (e.g., a machine learning algorithm) that is applied to the second dataset. The at least one algorithm is adapted to determine a second policy for the operation of the digital assistant 120 based on the collected second dataset.

At S360, a second policy that is associated with the second user is generated. The second policy may include a second set of behavior rules to be used by the digital assistant 120 when interacting with the second user. In an embodiment, S360 may include storing the second policy for subsequent use, thereby allowing for conserving computing resources during subsequent instances when the second user is identified.

At S370, it is checked whether the first user and the second user are determined to be within a predetermined distance from each other and, if so, execution continues with S380; otherwise, execution continues with S375. It should be noted that determining whether the first user and the second user are located within the predetermined distance may be achieved by collecting real-time, or near-real-time, sensor data from the environment near the user. The collected sensor data may be analyzed using, for example and without limitation, one or more computer vision techniques, audio signal processing techniques, machine learning techniques, and the like.

At S375, upon determination that only one user is identified, or that the first user and the second user are not determined to be within a predetermined distance, a single policy is selected. A single policy may be associated with only one of the users, i.e., with the user identified to be in close proximity to the digital assistant 120. For example, if only the first user is identified, the first policy that is associated with the first user may be selected and used by the digital assistant 120 when interacting with the first user.

At S380, upon determination that the first user and the second user are within a predetermined distance, a modified policy is generated based on the first policy and the second policy. As described hereinabove, the generated modified policy is a policy including multiple behavior rules related to one or more users. A modified policy may be generated based on a combination of the first set of behavior rules of the first policy and the second set of behavior rules of the second policy, extraction of overlapping portions (e.g., behavior rules) of the first set of behavior rules and the second set of behavior rules, exploration of possible users' preferences based on the first policy and the second policy, and the like.

Generation of the modified policy, at S380, may include, without limitation, generation of a policy including one or more rules. The rules included in the generated policy may be rules included in one or more of the first policy, the second policy, or the like. Further, the rules included in the generated policy may be rules common to both the first and second policies, and such rules may further correspond with one or more preferences of the various relevant users. In addition, as described hereinabove, the rules of the first policy, the second policy, the rules of the modified policy, and the like, may be ranked. The ranked rules may be considered in the generation of one or more modified policy rules, including, without limitation, generation of modified policy rules including various levels of priority, where such priority levels may be based on rule rankings.

Further, in an embodiment, generation of the modified policy may include, for the case in which the first and second policies include insufficient common information to provide for generation of the modified policy as otherwise described, generation of the modified policy based on one or more third policies similar to the first policy, the second policy, or both. Where generation of the modified policy includes generation based on such similar policies, generation, at S380, may include collection of one or more similar policies from one or more sources of policy information including, without limitation, the DB 160, of FIG. 1, above.

According to the same embodiment, such collection may include identification of such similar policies based on various common attributes (e.g., based on a number of common attributes above a threshold, matching of one or more required common attributes, a combination thereof, and the like), where such common attributes may include, as examples and without limitation, age, location, and other, like, attributes of the users corresponding to the policies. In an example, generation according to the same embodiment may include, for two co-located users with policies including no common attributes, selection of, from the DB 160, a policy which includes descriptive attributes matching, or similar to, those of one of the two co-located users.

According to the same example, a similar policy may be selected to replace a first user policy, in generation of a modified policy at S380, based on a match between the age and location of the first user and the user corresponding to the selected replacement policy. According to the same example, where the selected replacement policy includes a preference for jazz music, and where the first user's policy did not include any musical preference, the substitution of the replacement policy for the first user's policy may provide for the generation of a modified policy, as described herein, based on the selected replacement policy and the second user's policy, including the replacement policy's specified jazz music preference.

In a second embodiment, generation of the modified policy may include, for the case in which no policy is identified for a user determined to be co-located with another user, generation of a simulated policy for the user for whom no policy is identified, followed by generation of a modified policy, as described, based on the simulated policy and the known policy of the other user. Generation of the simulated policy may include, without limitation, collection of one or more policies, or portions thereof, from various sources. In an example, according to the same embodiment, where two users are co-located, and a known policy is identified for the first user but not for the second, generation of a modified policy at S380 may include generation of a simulated policy for the second user, followed by generation of a modified policy based on the first user's policy and the simulated policy, as described herein. The simulated policy may be generated by aggregating individual policy parameters from multiple policies of multiple users having at least one common attribute with the second user. As a non-limiting example, policy parameters having the highest counts among the users having at least one common attribute with the second user are included in the simulated policy.

In a third embodiment, generation of the modified policy may include, for the case in which no policy is identified for any co-located user, generation of simulated policies for each co-located user, followed by generation of a modified policy based on the simulated policies, as described herein. Generation of the simulated policies may include, without limitation, collection of sensor data concerning each user, as well as generation of simulated policies based on such sensor data. In an example, according to the same embodiment, generation of the modified policy at S380 for two co-located users, where a known policy cannot be identified for either user, may include collection of sensor data concerning each user, generation of simulated policies for each user based on the collected sensor data, and generation of a modified policy based on such simulated policies, as described herein.

Further, as may be applicable to the embodiments described herein, generation or collection of simulated, replacement, substitute, and other, like, policies, may include collection of data collected or recorded by other digital assistants similar or identical to those described herein, including from databases, such as the DB 160, without loss of generality or departure from the scope of the disclosure.

In an embodiment, S380 may further include storing the modified policy for subsequent use. Storing the modified policy for subsequent use allows for conserving computing resources at a later time when the first user and the second user are again identified within a predetermined distance of each other. In other words, when the users are subsequently in proximity to each other again, the stored modified policy may be used rather than generating a new modified policy.

At S390, at least one plan is executed based on the modified policy. The at least one plan may be executed upon receiving an indication that an execution of a plan is needed or upon detecting a trigger, as further discussed above with respect to FIG. 2. As described hereinabove, a trigger is a condition such as detection of a specific user or user action which can be detected based on sensor readings. As a non-limiting example where a trigger condition relates to detection of two users entering a vehicle, the trigger condition may be satisfied where sensor 140 data indicates that two users are present in a vehicle.

In an embodiment, executing at least one plan based on the modified policy, at S390, includes causing an input/output (I/O) device to output a signal in order to cause one or more interactions with the outside world (e.g., via an external system such as the external system 180, FIG. 1). An I/O device is a device, system, component, or the like, configured to interface between an information processing system (e.g., a computer) and the outside world. To this end, each I/O device may be configured to send or receive various signals to or from various external devices, components, or systems. The signal sent to, or received from, the various external devices may be a signal relevant to the operation of the external device, component, or system, such as, as examples and without limitation, commands, instructions, data readings, and the like.

As a non-limiting example, an I/O device may be configured to interface with an external system functioning as an air conditioning unit (A/C unit). Further, according to the same example, the I/O device may be configured to send signals to the A/C unit, where the signals are configured to, when received by the AC unit, adjust the temperature of the A/C. Accordingly, for the same example, executing a plan, at S390, by causing an I/O device to output a signal may include causing the I/O device to send a signal to the AC unit, the signal being configured to cause the AC unit to lower the AC temperature by five degrees Fahrenheit.

At S395, it is checked whether to continue the operation and, if so, execution continues with S310; otherwise, execution terminates.

Figure 4:
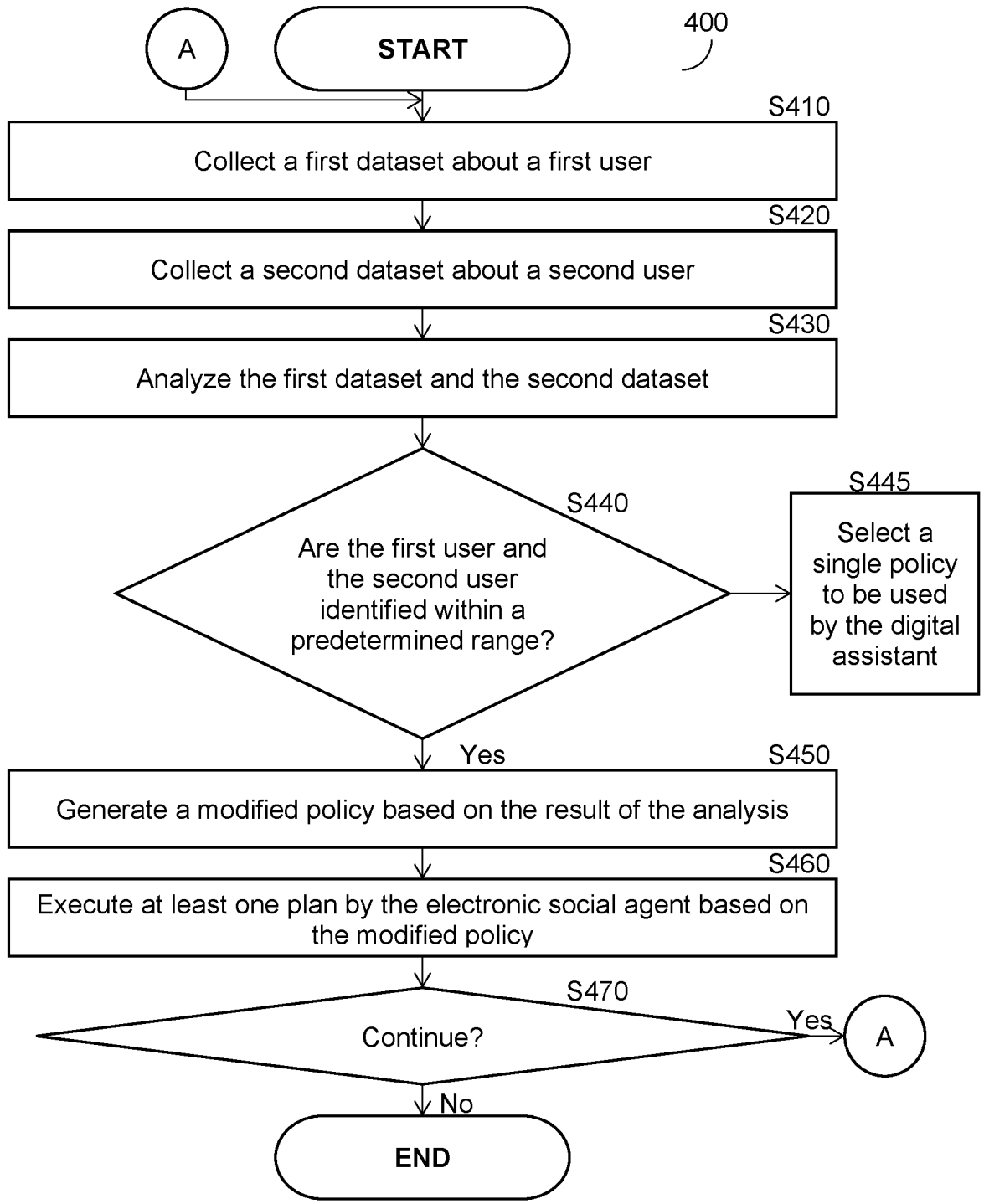
FIG. 4 is a flowchart illustrating a method for generating a modified input/output policy for multiple users, according to an embodiment.

FIG. 4 shows a flowchart 400 of a method for generating a modified input/output policy for multiple users, according to an embodiment. The method described with respect to FIG. 4 may be applicable to a scenario such as, as an example and without limitation, one in which generation of a single policy for multiple users is desirable, such as for a group including an unknown user for whom a policy has not been determined. The method described herein may be executed by the controller 130 that is further described hereinabove with respect of FIG. 2.

At S410, a first dataset about a first user is collected. The first dataset may be collected using one or more sensors, e.g., the sensors 140, from the Internet, from the user's calendar, and the like. Collection of the first dataset may include collection of one or more data features, including via collection similar or identical to that described with respect to S310 of FIG. 3, above.

At S420, a second dataset about a second user is collected. The second dataset may be collected using one or more sensors, e.g., the sensors 140, from the Internet, from the user's calendar, and so on. Collection of the second dataset may include collection of one or more data features, including via collection similar or identical to that described with respect to S340 of FIG. 3, above. Further, it may be understood that the first and second datasets may include the same type of information, where the information included in the first dataset relates to the first user and where the information included in the second dataset relates to the second user.

At S430, the first dataset and the second dataset are analyzed using at least one algorithm (e.g., a machine learning algorithm) that is applied to the first dataset and the second dataset. The at least one algorithm is adapted to determine a modified policy for the operation of the digital assistant 120 based on the collected first dataset.

At S440, it is determined whether the first user and the second user are within a predetermined distance and, if so, execution continues with S450; otherwise, execution continues with S445. It should be noted that determining whether the first user and the second user are located within the predetermined distance may be achieved by collecting real-time, or near-real-time, sensor data from the environment near the user. The collected sensor data may be analyzed using, for example and without limitation, one or more computer vision techniques, audio signal processing techniques, machine learning techniques, and the like.

At S445, upon determination that only one user is identified or that the first user and the second user are not identified within a predetermined distance, a single policy may be selected, and one or more plans of the selected single policy may be executed. A single policy may be associated with only one of the users, i.e., with the user that was identified in close proximity to the digital assistant 120. For example, if only the first user is identified, the first policy that is associated with the first user may be selected and used by the digital assistant 120 when interacting with the first user. Further, execution of one or more plans of the selected single policy may be performed as described with respect to S460, below.

At S450, upon determination that the first user and the second user were identified within a predetermined distance, a modified policy is generated based on the result of the analysis of the first dataset and the second dataset. Generation of a modified policy, at S450, based on the result of the analysis of the first dataset and the second dataset, may be performed as described with respect to S380 of FIG. 3, above.

At S460, at least one plan is executed based on the modified policy. The at least one plan may be executed upon receiving an indication that an execution of a plan is needed, or a similar trigger. As described hereinabove, a trigger is a condition such as detection of a specific user or user action. As an example, where a trigger condition relates to detection of two users entering a vehicle, the trigger condition may be satisfied where sensor 140 data indicates that two users have entered a vehicle.

Further, execution of at least one plan at S460 may be performed as described with respect to S390 of FIG. 3, above, including, without limitation, execution including causing an I/O device to output a signal, wherein the signal may be relevant to the operation of an external device.

At S470, it is checked whether to continue the operation and, if so, execution continues with S410; otherwise, execution terminates.

Figure 5:
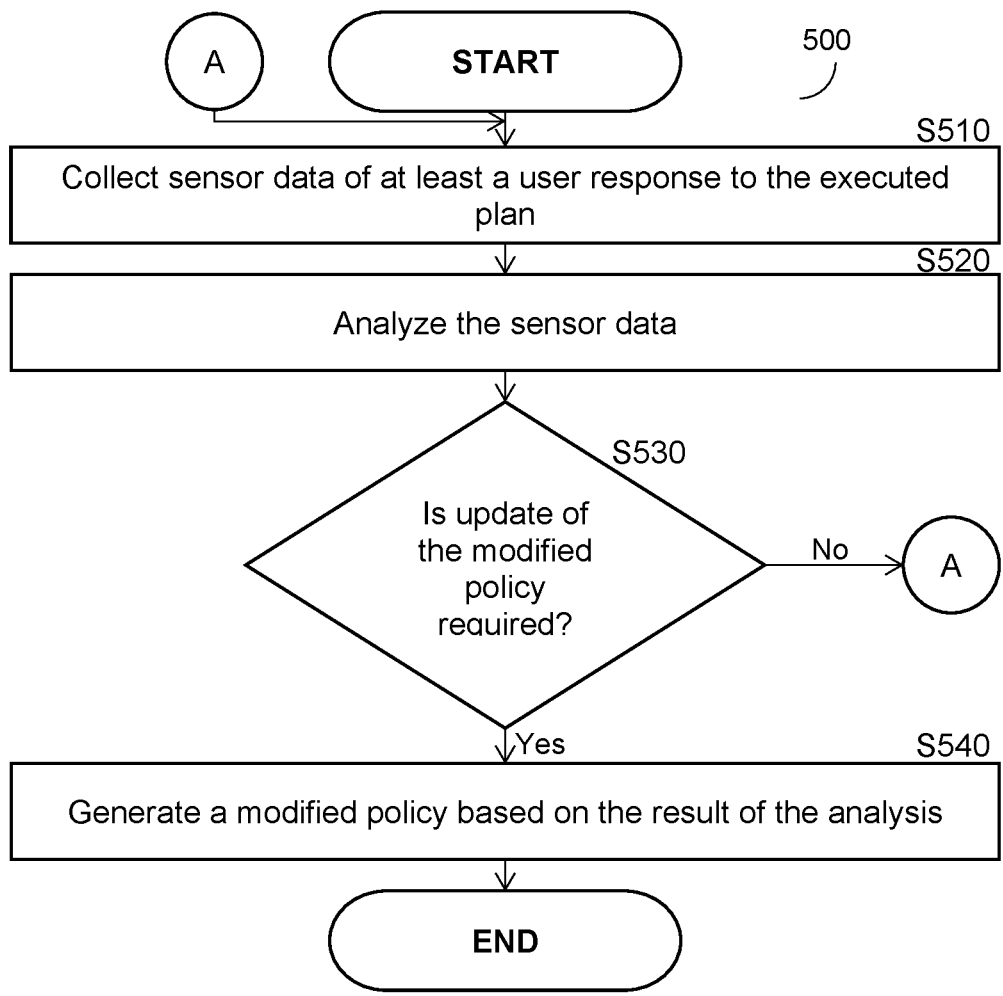
FIG. 5 is a flowchart illustrating a method for updating the modified policy based on an identified at least one user response, according to an embodiment.

FIG. 5 is a flowchart 500 illustrating a method for updating the modified policy based on an identified at least one user response, according to an embodiment. The method described herein may be executed by the controller 130 that is further described hereinabove with respect to FIG. 2.

At S510, at least sensor data of at least a user response (of the first user and/or the at least a second user) is collected with respect to an executed plan. The collection may be achieved using one or more sensors (e.g., the sensors 140). The user response may include facial expressions, verbal content, and the like, which, when analyzed, may indicate whether the first user and/or the second user accepted the executed plan, where the executed plan is based on the modified policy.

At S520, the sensor data of the user response is analyzed. The analysis may be performed using, for example and without limitation, one or more computer vision techniques, audio signal processing techniques, machine learning techniques, and the like. The sensor data is indicative of a user response (such as the response of the first user and/or of the at least a second user) to the execution of the at least one plan, which is based on the modified policy.

At S530, it is determined whether updating the modified policy is required and, if so, execution continues with S540; otherwise, execution continues with S510. Determining whether updating the modified policy is required is achieved based on the result of the analysis and the nature of the user response. For example, in case both users are smiling and singing after the executed plan started playing country music, an update of the modified plan may not be required. However, when at least one user seems to be angry or unsatisfied with the executed plan, an update of the modified policy may be required.

At S540, the modified policy is updated based on the result of the analysis. The update may include adjusting one or more rules of the modified policy for executing plans based on the user response to the executed plan. It should be noted that the modified policy may be updated such that, in a future, similar, scenario, a plan that affected at least one user in a negative manner will not be executed, and a plan that affected both users in a positive manner will be executed.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a modified input/output (I/O) device policy for multiple users, comprising:

generating a modified policy based on a first policy and a second policy, wherein the modified policy is generated when a first user and a second user are located within a predetermined distance of each other, wherein the first policy is generated for the first user based on a first dataset including data related to the first user with respect to at least one I/O device, wherein the second policy is generated for the second user based on data related to the at least one I/O device; and executing at least one plan based on the modified policy, wherein executing the at least one plan further comprises causing the at least one I/O device to output a signal for causing at least one action by an external system with respect to the outside world; wherein the external system is external to the at least one I/O device, wherein the outside world is the world outside of a set of computing components including the external system and the at least one I/O device.

2. The method of claim 1, wherein whether the first user and the second user are located within the predetermined distance is determined based on sensor data collected from an environment occupied by the first user and the second user.

3. The method of claim 1, further comprising:
generating the second policy at a first time;
storing the generated second policy in a database; and
generating a second modified policy based on the stored second policy at a second time when the second user is located within a predetermined distance of a third user.

4. The method of claim 1, wherein each of the first policy and the second policy is generated based further on at least one third policy, wherein each of the at least one third policy has at least a threshold number of attributes in common with the first policy and with the second policy.

5. The method of claim 1, wherein the at least one plan is at least one first plan, wherein the modified policy is generated at a first time when the first user and the second user are within a predetermined distance, further comprising:
storing the modified policy; and
executing at least one second plan based on the modified policy at a second time when the first user and the second user are within a predetermined distance.

6. The method of claim 1, wherein generating the modified policy further comprises:
aggregating a plurality of individual policy parameters, wherein the individual policy parameters of the plurality of individual policy parameters are parameters of respective policies having at least one attribute in common with the second policy; and
generating a synthetic policy based on the aggregated plurality of individual policy parameters, wherein the second policy is the synthetic policy.

7. The method of claim 1, further comprising:
collecting sensor data of a user response by at least one of the first user and the second user, wherein the sensor data is indicative of the response of at least one of the first user and the second user to the execution of the at least one plan based on the modified policy;
analyzing the collected sensor data; and
updating the modified policy based on the analysis.

8. A non-transitory computer readable medium having stored thereon instructions for causing a processing circuitry to execute a process, the process comprising:
generating a modified policy based on a first policy and a second policy, wherein the modified policy is generated when a first user and a second user are located within a predetermined distance of each other, wherein the first policy is generated for the first user based on a first dataset including data related to the first user with respect to at least one I/O device, wherein the second policy is generated for the second user based on data related to the at least one I/O device; and
executing at least one plan based on the modified policy, wherein executing the at least one plan further comprises causing the at least one I/O device to output a signal for causing at least one action by an external system with respect to the outside world, wherein the external system is external to the at least one I/O device, wherein the outside world is the world outside of a set of computing components including the external system and the at least one I/O device.

9. A system for generating a modified input/output (I/O) device policy for multiple users, comprising:
a processing circuitry; and
a memory, the memory containing instructions that, when executed by the processing circuitry, configure the system to:
generate a modified policy based on a first policy and a second policy, wherein the modified policy is generated when a first user and a second user are located within a predetermined distance of each other, wherein the first policy is generated for the first user based on a first dataset including data related to the first user with respect to at least one I/O device, wherein the second policy is generated for the second user based on data related to the at least one I/O device; and
execute at least one plan based on the modified policy, wherein executing the at least one plan further comprises causing the at least one I/O device to output a signal for causing at least one action by an external system with respect to the outside world, wherein the external system is external to the at least one I/O device and to the system, wherein the outside world is the world outside of a set of computing components including the external system and the at least one I/O device.

10. The system of claim 9, wherein whether the first user and the second user are located within the predetermined distance is determined based on sensor data collected from an environment occupied by the first user and the second user.

11. The system of claim 9, wherein the system is further configured to:
generate the second policy at a first time;
store the generated second policy in a database; and
generate a second modified policy based on the stored second policy at a second time when the second user is located within a predetermined distance of a third user.

12. The system of claim 9, wherein each of the first policy and the second policy is generated based further on at least one third policy, wherein each of the at least one third policy has at least a threshold number of attributes in common with the first policy and with the second policy.

13. The system of claim 9, wherein the at least one plan is at least one first plan, wherein the modified policy is generated at a first time when the first user and the second user are within a predetermined distance, and wherein the system is further configured to:
store the modified policy; and
execute at least one second plan based on the modified policy at a second time when the first user and the second user are within a predetermined distance.

14. The system of claim 9, wherein the system is further configured to:
aggregate a plurality of individual policy parameters, wherein the individual policy parameters of the plurality of individual policy parameters are parameters of respective policies having at least one attribute in common with the second policy; and
generate a synthetic policy based on the aggregated plurality of individual policy parameters, wherein the second policy is the synthetic policy.

15. The system of claim 9, wherein the system is further configured to:
collect sensor data of a user response by at least one of the first user and the second user, wherein the sensor data is indicative of the response of at least one of the first user and the second user to the execution of the at least one plan based on the modified policy;
analyze the collected sensor data; and
update the modified policy based on the analysis.

* * * * *